United States Patent [19]

Iwata et al.

[11] 3,997,905
[45] Dec. 14, 1976

[54] PROGRAM-CONTROLLED SHUTTER

[75] Inventors: Hiroshi Iwata, Osaka; Katsuji Ishikawa, Daito, both of Japan

[73] Assignee: West Electric Company, Ltd., Japan

[22] Filed: Apr. 11, 1975

[21] Appl. No.: 567,231

[30] Foreign Application Priority Data

Apr. 18, 1974 Japan .............................. 49-44101

[52] U.S. Cl. ................................ 354/29; 354/23 D; 354/44
[51] Int. Cl.$^2$ ....................... G03B 7/08; G03B 9/08
[58] Field of Search .............. 354/23 D, 26, 29, 30, 354/44, 60 A, 234; 352/141

[56] References Cited

UNITED STATES PATENTS

| | | |
|---|---|---|
| 3,744,385 | 7/1973 | Burgarella et al. .............. 354/23 D |
| 3,813,680 | 5/1974 | Wagensonner et al. ......... 354/23 D |
| 3,882,522 | 5/1975 | Erlichman ....................... 354/44 X |

*Primary Examiner*—L. T. Hix
*Assistant Examiner*—J. A. LaBarre
*Attorney, Agent, or Firm*—Burgess Ryan and Wayne

[57] ABSTRACT

The invention discloses a program-controlled shutter of the type in which, in response to the brightness of a subject, an electronic control circuit controls the motions of a stepping motor so that a plurality of shutter blades coupled thereto may be opened to define a desired aperture, for a time interval, depending upon the brightness of the subject. The control circuit includes a pulse generator, a circuit for determining the number of pulses to be applied to the stepping motor in response to the brightness of the subject so that the shutter blades may be opened to define an aperture optimum for that brightness, a time constant circuit for determining the exposure time; that is, the time interval from the time when the shutter blades begin to open to the time when they are closed again as a function of the aperture defined depending upon the brightness of the subject, a circuit for changing the time constant of the time constant circuit depending upon the opening pulses applied to the stepping motor, a circuit for causing the stepping motor to close the shutter blades after they are opened to define the desired aperture, a circuit for resetting the above circuits immediately after the shutter blades are closed again, and a circuit for selectively connecting the above circuits to a power supply.

15 Claims, 16 Drawing Figures

FIG. IA
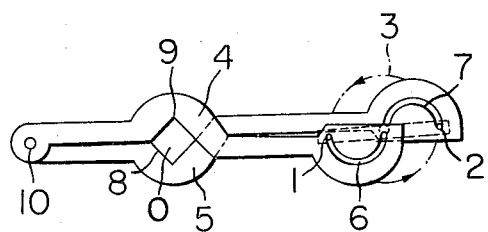
FIG. IB
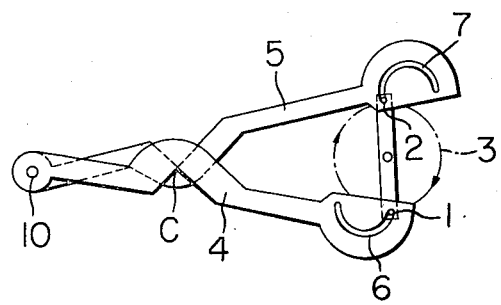
FIG. 2
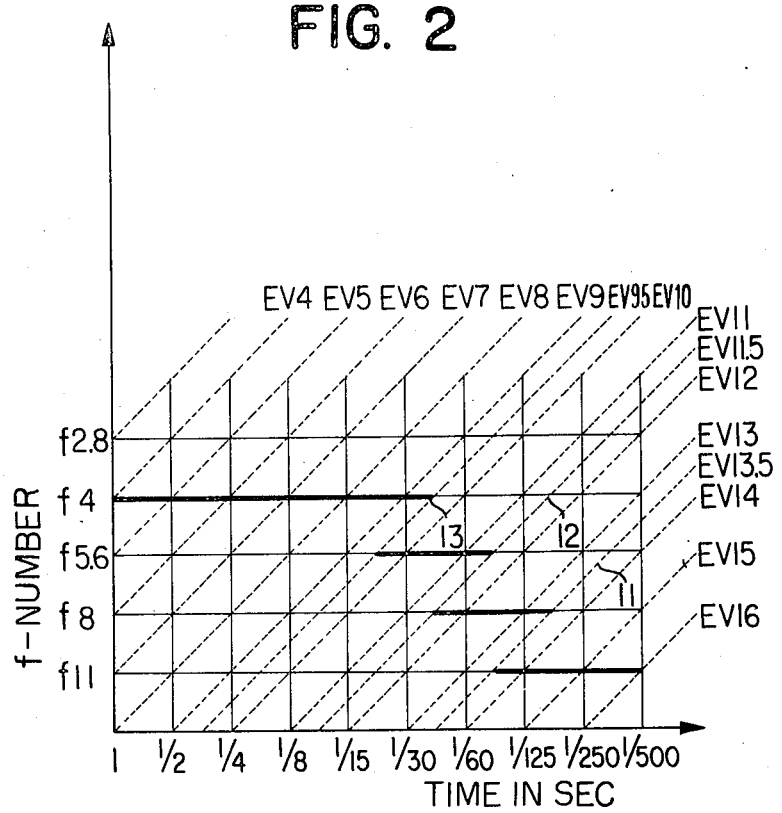

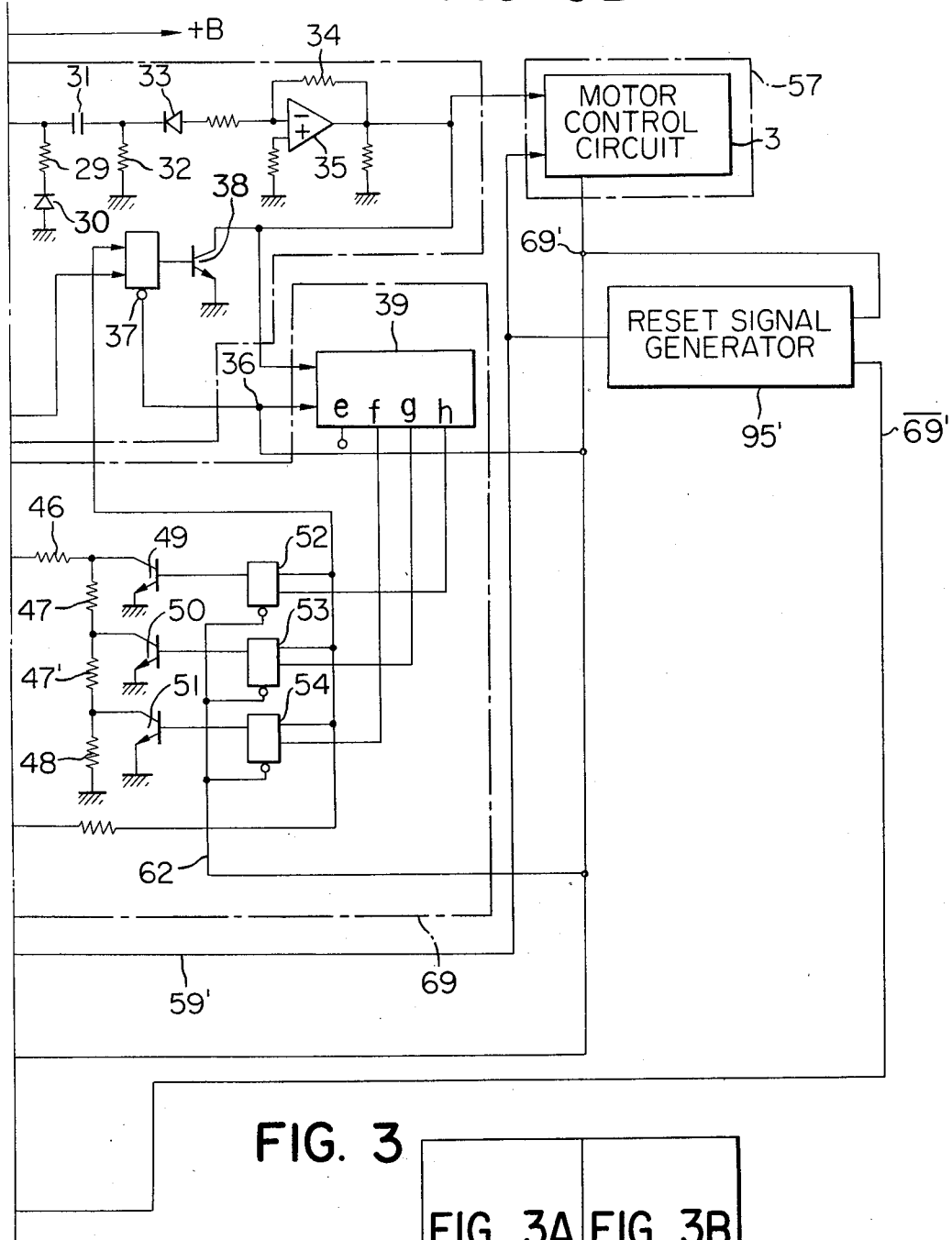

FIG. 8
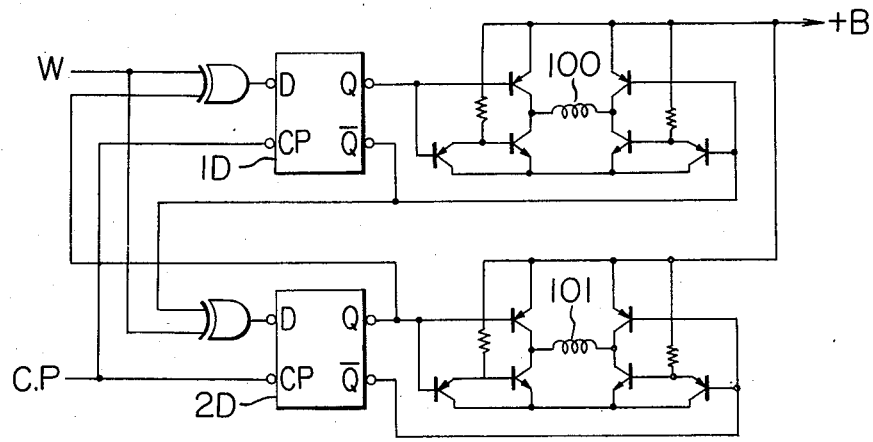
FIG. 9A
FIG. 9B
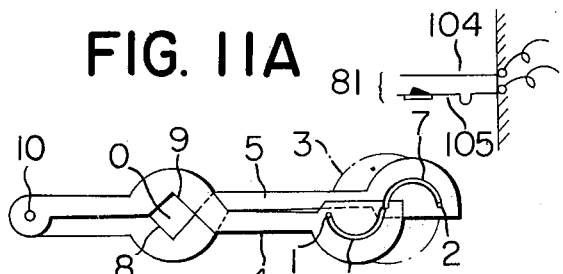
FIG. 10
FIG. 11A
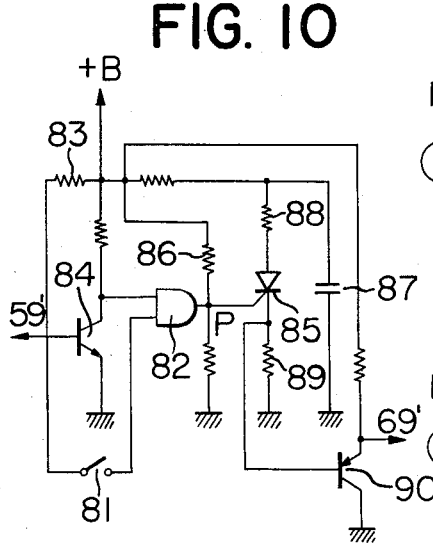
FIG. 11B
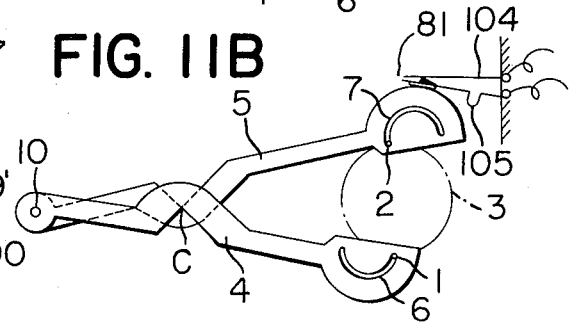

PROGRAM-CONTROLLED SHUTTER

BACKGROUND OF THE INVENTION

The present invention generally relates to a program-controlled shutter and more particularly to a program-controlled shutter of the type in which a plurality of shutter blades which also function as the aperture control blades, are opened to define a desired aperture or $f$-number, for a desired time, depending upon the brightness of a subject.

In the typical conventional program-controlled shutter, in response to the brightness of a subject, the aperture blades which are located before or after the shutter blades are opened or closed by suitable driving means, and thereafter, the exposure time is determined as a function of the apertures set. The automatic aperture blade control means in general consists of a moving coil, and in order to permit the automatic aperture control means to follow the relative fast change in brightness of the subject, it is so designed that its mechanical friction may be minimized. As a result, the automatic aperture control means is easily susceptible to damages due to mechanical shocks or impacts. The conventional program-controlled shutters have another common undesirable feature that is their construction is very complex because both complex aperture control and shutter control mechanisms must be mechanically incorporated.

In the conventional program-controlled shutters, the mechanical energy which is stored when the film is advanced is released to actuate the shutter blades, and a relatively greater force is required to liberate this energy, so that the shutter button depression often results in shaking of the camera.

In order to remotely control the shutter operation, in the conventional shutters by an electrical signal, the shutter release button must be operatively coupled to a suitable solenoid, so that the latter may be energized in response to the remote control signal to depress the shutter release button. However, such an arrangement makes it difficult to attain the desired synchronization between the application or transmission of the control signal and the resulting shutter operation because of the unavoidable time lag between the time when the current starts to flow through the solenoid coil and the time when the solenoid produces the sufficient driving force for depressing the shutter button, and because of the delay in transmission of the driving force to the shutter release button due to the mechanical driving force transmitting mechanism. Furthermore, such a remote control system is very complex, large in size and heavy in weight because of the provision of the solenoid and the mechanical system for coupling the solenoid to the shutter release button.

SUMMARY OF THE REPRESENT INVENTION

The present invention was therefore made to substantially overcome the above and other difficulties encountered in conventional program-controlled shutters.

One of the objects of the present invention is to provide a program-controlled shutter which is simple in construction, sufficiently robust to protect against mechanical shocks or impacts, and very reliable and dependable in operation even if used very frequently.

Another object of the present invention is to provide a program-controlled shutter which is actuated in response to an electrical signal generated when a switch coupled to a shutter release button is closed so that the force required for actuating the shutter may be minimized to a level hitherto unattainable by the conventional shutters.

A further object of the present invention is to provide a program-controlled shutter whose actuation may be sufficiently synchronized with the transmission of the electrical remote control signal so that a light or sound remote control signal which may be easily converted into an electrical signal may be advantageously used without causing any serious time lag between the transmission of the remote control signal and the actuation of the shutter.

Briefly stated, the present invention provides a program-controlled shutter of the type comprising intermittent driving means which is rotated or otherwise moved through a discrete angle or step in response to each control pulse signal, a plurality of shutter blades being coupled to the intermittent driving means, and an electronic control circuit for controlling the intermittent driving means in such a way that the shutter blades which also function as the aperture control blades, are opened to define a desired aperture for a desired time interval for the best exposure depending upon the brightness of a subject. The control circuit includes a pulse signal generator, a circuit for determining the number of pulse signals to be applied to the intermittent driving means such as a stepping motor, depending upon the brightness of the subject, so that the shutter blades are opened stepwise to define a desired aperture or a desired $f$-number, a time constant circuit for determining the exposure time that is, the time interval between the time when the shutter blades begin to open and the time when they are completely closed again, a circuit for changing the time constant of the time constant circuit depending upon the number of pulses applied to the intermittent driving means, a circuit for causing the intermittent driving means to close the shutter blades, a circuit for resetting the above circuits immediately after the shutter blades are closed, and a circuit for selectively connecting the above circuits to a power supply.

BRIEF DESCRIPTION OF THE DRAWINGS

FIGS. 1A and 1B show an exposure control mechanism used in the present invention and comprised of a stepping motor and two shutter blades which also function as the aperture control blades;

FIG. 2 is an exposure program used in a preferred embodiment of the present invention;

FIG. 3, separated as shown into FIGS. 3A and 3B, is a circuit diagram of a control circuit in accordance with the present invention for controlling the exposure control mechanism shown in FIGS. 1A and 1B;

FIG. 8 is a diagram of a circuit for controlling the stepping motor;

FIGS. 9A and 9B are diagrams used for the explanation thereof;

FIG. 10 is a detailed diagram of a reset signal generator shown in FIG. 3; and

FIGS. 11A and 11B show a switch used in the reset signal generator shown in FIG. 10.

DESCRIPTION OF THE PREFERRED EMBODIMENT

Figure 3A:
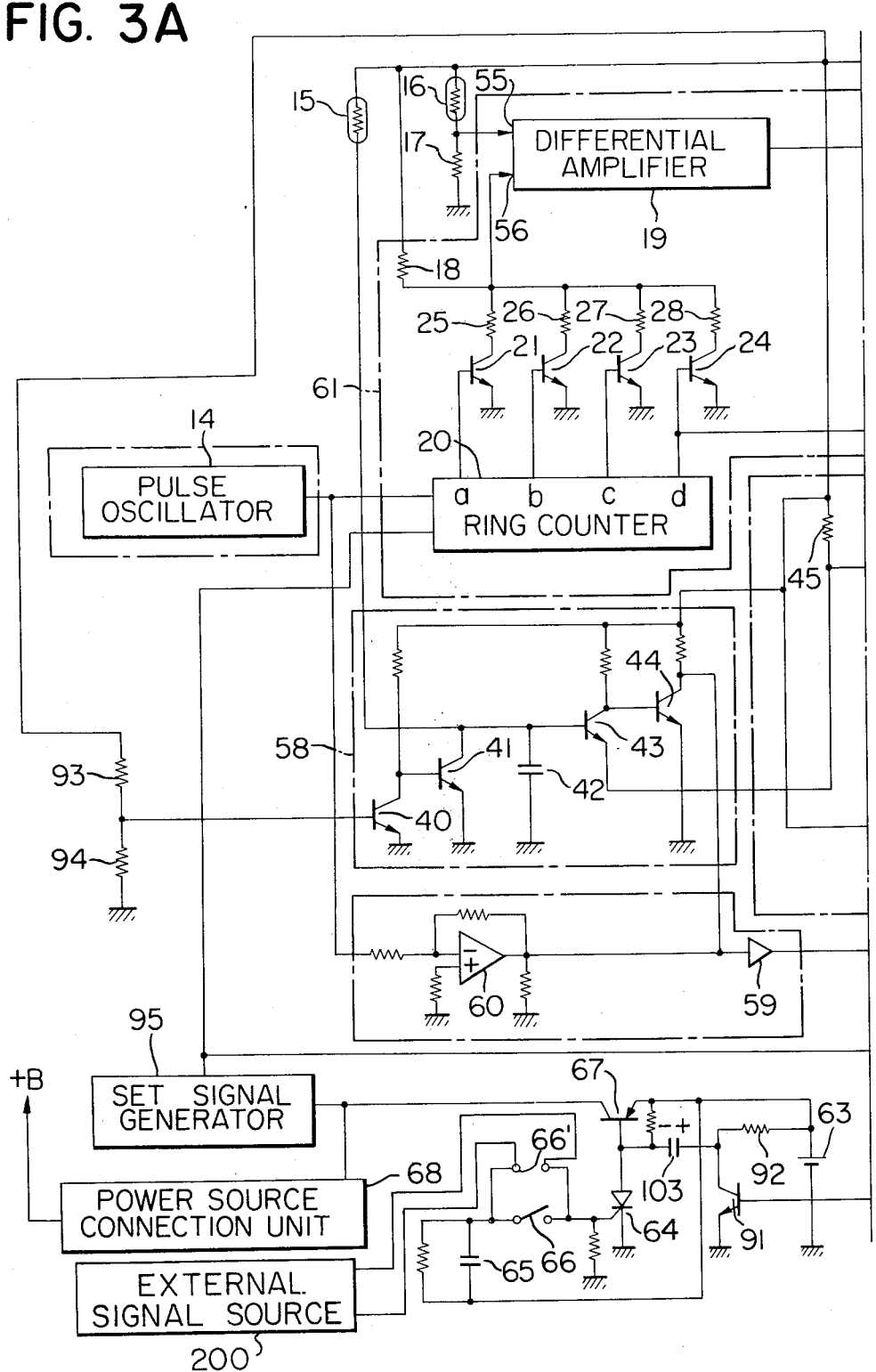

The present invention uses a stepping motor which is used in a shutter control system in which the shutter blades are controlled by stepping motor and is disclosed in the copending U.S. Pat. application Ser. No. 519,653.

FIGS. 1A and 1B show a shutter blade assembly and its control system used in the present invention. A pair of shutter blades 4 and 5 which also function as the aperture blades each have one end pivoted to each other with a pin 10, and are provided with arcuate grooves 6 and 7 into which are fitted driving pins 1 and 2 of a stepping motor 3. The shutter blades 4 and 5 are also provided with curved portions 8 and 9 which define an aperture in a manner to be described hereinafter. When the stepping motor 3 is intermittently rotated in the direction indicated by the arrow shown in FIG. 1A, its driving pins 1 and 2 move along the arcuate grooves 6 and 7 of the shutter blades 4 and 5 so that the aperture 0 opened as shown in FIG. 1A is closed as indicated by C in FIG. 1B. On the other hand, when the stepping motor 3 is rotated in the opposite direction, the closed aperture is opened as shown in FIG. 1A. The opening area of the aperture 0 may be suitably controlled by selecting the radius of curvature of the guide grooves 6 and 7. In the instant embodiment, two shutter blades are used, but it is to be understood that a plurality of shutter blades may be used.

The present invention provides a program-controlled shutter of the type in which the exposure control mechanism of the type described in conjunction with FIGS. 1A and 1B is controlled by an electronic control circuit shown in FIG. 3.

Prior to the description of the control circuit shown in FIG. 3, the exposure conditions used in the instant embodiment will be explained. It is assumed that in response to one pulse signal, the stepping motor 3 is rotated through a discrete angle of 18° and that the completely closed aperture C shown in FIG. 1B is opened wide as shown in FIG. 1A when the driving pins 1 and 2 are rotated through 90°. Therefore, the opening area of the aperture changes in five steps. For instance, the smallest aperture defined when the stepping motor 3 is rotated only through 18° in response to one pulse signal may be defined as $f$-11. In like manner, the aperture defined when the stepping motor 3 is rotated through two steps; that is, 36° in response to two pulse signals, may be defined as $f$-8; the aperture defined when the stepping motor 3 is rotated through three steps, that is, 54° in response to three pulse signals may be defined as $f$-5.6; and the aperture defined when the stepping motor 3 is rotated through four steps, that is, 72° in response to four pulse signals may be defined as $f$-4. In other words, the desired aperture or $f$-number may be obtained depending upon a number of pulse signals to be applied to the stepping motor. Therefore, in exposure, the aperture is selected depending upon the brightness of a subject and is kept opened for a predetermined time which is programmed depending upon the brightness of the subject and the selected aperture or $f$-number.

In the instant embodiment, as shown in FIG. 2, the exposure value EV which is dependent upon the $f$-number and the exposure time is selected between EV-16 and EV-4. When the film speed is selected, the exposure value EV is a measure of the brightness of a subject. In the instant embodiment, the $f$-number $f$-11 is switched to $f$-8 at EV-13.5 as indicated by the dotted line 11; $f$-8 is switched to $f$-5.6 at EV-11.5 as indicated by the dotted line 12; $f$-5.6 is switched to $f$-4.0 at EV-9.5 indicated by the dotted line 13. Therefore, for EV-13, the $f$-number $f$-8 is selected and the exposure time is 1/125 sec. In summary, in the instant embodiment, the $f$-number is first selected, and then the exposure time is set for the given exposure value EV.

Next referring to FIG. 3, the electronic control circuit for controlling the exposure control mechanism shown in FIG. 1 will be described in detail. When a power switch 66 which is interlocked with a shutter release button is closed, the current flows from a capacitor 65, which has been charged by the current from a battery 63, to the gate of a thyristor 64, so that the latter is turned on. Consequently, the base current flows from the battery to the base of a transistor 67, so that the latter is turned on to apply the battery voltage to a load connected to the collector thereof. When the thyristor 64 conducts, it remains conducting so that the transistor 67 also remains conducting. Therefore, the current from the battery 63 continuously flows into a set signal generator 95 and a power source connection unit 68, thereby controlling various circuit blocks encircled by the dot-dash lines to be described hereinafter.

The set signal generator 95 applies the set signals to various memory means such as a ring counter 20 and a flip-flop 37 in a first control circuit generally indicated by 61, a ring counter 39 and flip-flops 52, 53 and 54 in an integrated level control circuit generally indicated by 69, and a motor control circuit 57 so that these circuits 61, 69 and 57 are set to predetermined intitial conditions, respectively. In the instant embodiment, these circuits 61, 69 and 57 are electrically connected to the battery 63 when the transistor 67 conducts. Thereafter, the power source connection unit 68 releases the set signals and supplies the power to these circuits 61, 69 and 57.

Figure 4:
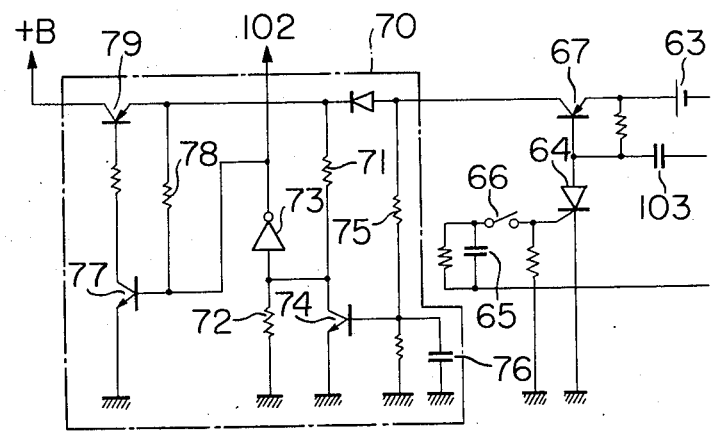
FIG. 4 is a detailed diagram of a set signal generator and a power supply connection circuit thereof.

FIG. 4 shows the details of the set signal generator 95 and the power source connection unit 68. When the transistor 67 conducts, the power is supplied from the battery 63 to a block 70 encircled by the dot-dash line. The high level signal across a resistor 72 which makes up a voltage divider together with a resistor 71, is converted into a low level signal by an inverter 73. This low level signal is transmitted from an output terminal 102 to the circuits 61, 69 and 57, so that they are set immediately when the transistor 67 conducts. A delay circuit consisting of a resistor 75 and a capacitor 76 is connected to the base of a transistor 74, so that the base current flows into it after a predetermined time after the transistor 67 conducts. When the transistor 74 conducts, the signal across the resistor 72 changes to a low level signal which is converted by the inverter 73 into a high level signal. In response to this high level signal, the operation for setting the circuits 61, 69 and 57 is completed, and the current flows through a resistor 78 into the base of a transistor 77. When the transistor 77 is conducted, a transistor 79 which is cascade-connected to the former also conducts. As a result, the power is supplied from a terminal +B through the transistor 79 to the various circuits.

Figure 5:
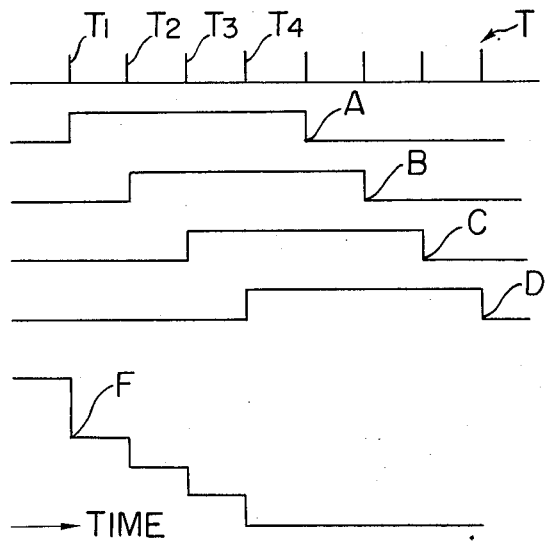
FIGS. 5, 6 and 7 are time charts used for the explanation of the mode of operation of the shutter in accordance with the present invention.

A pulse oscillator 14 generates a train of clock pulses with the pulse interval of 2 milliseconds as shown in FIG. 5. In response to the clock pulses from the oscillator 14, the ring counter 20 is actuated. The circuit 20 has four output terminals a, b, c and d which, in turn, are connected to the bases of transistors 21, 22, 23 and 24, respectively. In response to the first clock pulse $T_1$, the output, as shown at A in FIG. 5, appears at the output terminal a; in response to the second clock pulse $T_2$, the output, as shown at B in FIG. 5, appears at the terminal b; in response to the third clock pulse $T_3$, the output, as shown at C in FIG. 5, appears at the output terminal c; and in response to the fourth clock pulse $T_4$, the output, as shown at D in FIG. 5, appears at the output terminal d. In response to these outputs, the transistors 21, 22, 23 and 24 sequentially conduct.

The collectors of the transistors, 21, 22, 23 and 24 are connected through their respective collector resistors 25, 26, 27 and 28 to a common resistor 18, so that the voltage of the power source +B may be divided. As the transistors 21, 22, 23 and 24 sequentially conduct, their resistors 25, 26, 27 and 28 are also sequentially connected in parallel. The values of these resistors 25, 26, 27 and 28 are so selected that the combined resistance may be stepped down by one half as they are sequentially connected in parallel. Consequently, the step voltage as shown at F in FIG. 5 is applied to one input terminal 56 of a differential amplifier 19.

A photoconductive element 16 such as a CdS element for measuring the brightness of a subject is connected to a resistor 17 so that the voltage across the resistor 17 is in proportion to the brightness of the subject. That is, when the brightness of the subject is high, the photoconductive element has its resistance lowered, so that the voltage across the resistor 17 is high, and vice versa. The voltage across the resistor 17 appears on the other input terminal 55 of the differential amplifier to be compared with the step voltage applied to the input terminal 56, so that the output from the differential amplifier is in proportion to the brightness of the subject.

Figure 6:
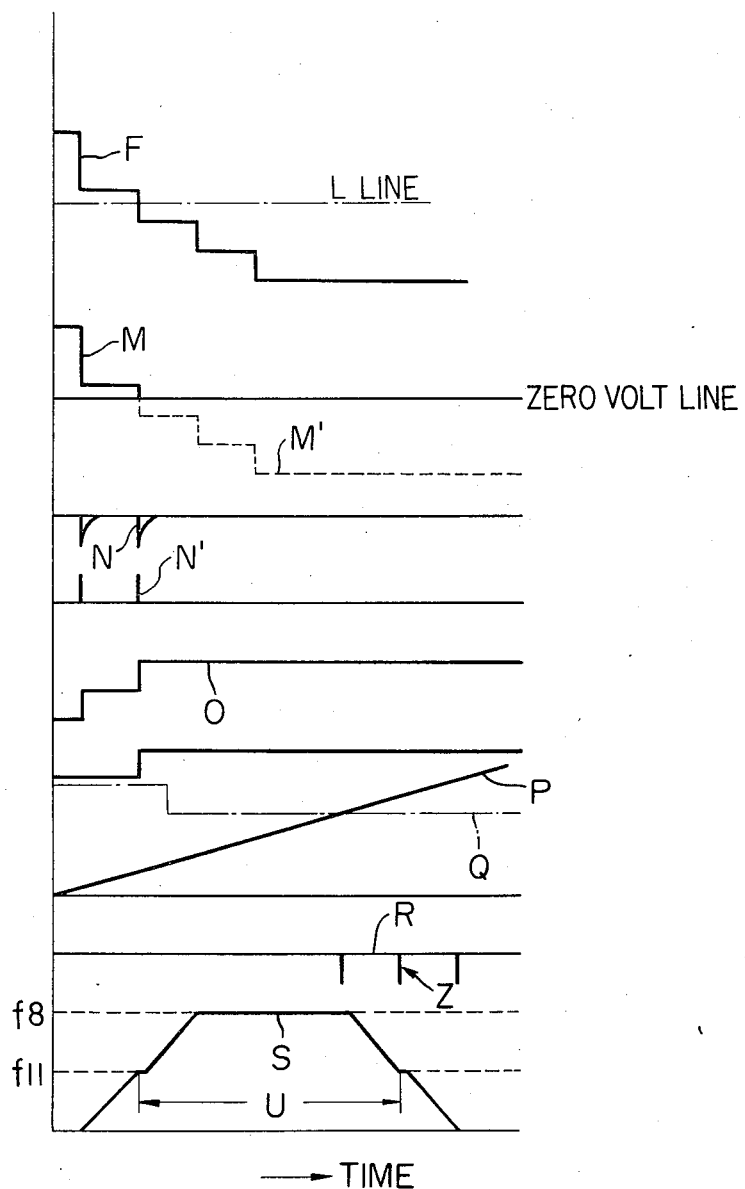

Referring to FIG. 6, when the brightness is low, the output from the differential amplifier 19 consists of the positive waveform M indicated by the solid lines above the 0 volt line and the negative waveform M' indicated by the dotted lines below the 0 volt line. Since a resistor 29 and a diode 30 are connected to the output terminal of the differential amplifier 19 as shown in FIG. 3, the negative component M' is cut off so that only the positive component M is applied to a differentiating circuit consisting of a capacitor 31 and a resistor 32. The output from the differentiating circuit consists of the negative going spikes as shown at N in FIG. 6. These spike pulses are converted by a diode 33 and an inverter 35 into positive going pulses as shown at N' in FIG. 6. These two positive going pulses N' are applied to the stepping motor 3, so that the latter is rotated in two steps. As a result, the shutter blades 4 and 5 (See FIG. 1) are opened in two steps. Thereafter, the exposure time is determined depending upon the f-number thus set and the exposure value.

In general, the exposure value EV is expressed in the APEX system as follows:

$$EV = Av + Tv$$

where
 $Av = f$-number, and
 $Tv =$ exposure time.
Therefore, in order to determine the exposure time after the f-number has been set, the operating level of a time constant circuit which determines the exposure time must be set accordingly. In the instant embodiment, the exposure time is determined by the ring counter 39, a time constant circuit 58 and the integration level control circuit 69.

Figure 7:
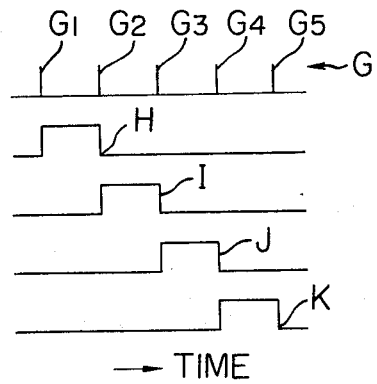

One input terminal of the ring counter 39 is connected to the output terminal of an inverter 35 or the input terminal of the stepping motor 3. Thus, assuming that four pulse signals are applied to the stepping motor as shown at G in FIG. 7, then, in response to the first pulse $G_1$, the output as shown at H in FIG. 7 appears at an output terminal e of the ring counter 39; in response to the second pulse signal $G_2$, the output as shown at I in FIG. 7 appears at an output terminal f; in response to the third pulse signal $G_3$, the output as shown at J in FIG. 7 appears at an output terminal g; and in response to the fourth pulse signal, the output as shown at K in FIG. 7 appears at an output terminal h. In response to these outputs from the ring counter 39, the J-K flip-flops 52, 53 and 54 are actuated so as to cause transistors 49, 50 and 51 to conduct, whereby one of resistors 46, 47, 47' and 48, all of which are connected to the emitter of a transistor 43 in the time constant circuit 58, may be short-circuited in response to the pulse signals applied to the stepping motor 3. Therefore, the voltage division ratio of the voltage divider consisting of the resistor 46, 47, 47' and 48 changes, so that the voltage across a resistor 45 also changes. Consequently, the operating level of the time constant circuit 58 also changes in response to the pulse signals applied to the stepping motor. For instance, in response to the positive pulse signals (See FIG. 6, N'), the output signal O appears at the output terminal f of the ring counter 39, so that the flip-flop 54 causes the transistor 51 to conduct. As a result, the voltage divider resistor 48 is short-circuited, and that voltage which is determined by the value of the combined resistance of the resistors 46, 47 and 47', is applied to the emitter of the transistor 43 in the time constant circuit 58. Thus, the operating level of the time constant circuit 58 is determined by J-K flip-flops 52/54, transistors 49–51, resistors 47, 47' and 48, all acting as a voltage driving means for adjusting the operating level of the time constant circuit 58, so that the exposure time for the optimum exposure may be selected.

In the instant embodiment, the exposure time is determined by a photoconductive element such as a CdS element 15, the time constant circuit 58 including an integrating capacitor 42, switching transistors 40 and 41 and a transistor 44. In response to the voltage across a resistor 94 which makes up a voltage divider together with another resistor 93, the transistor 40 conducts and the transistor 41 is cut off almost concurrently with the steps for setting the optimum aperture and for setting the operating level of the time constant circuit 58, so that the capacitor 42 starts the integration of the current from the photoconductor 15 as shown at P in FIG. 6. When the voltage across the capacitor 42 reaches the operating level Q of the time constant circuit 58, the transistor 43 conducts but the transistor 44 is cut off, so that the input to an amplifier 59 is allowed.

The clock pulses from the oscillator 14 are inverted by an inverter 60 into the negative going pulses as shown at R in FIG. 6. These negative going pulses are amplified by the amplifier 59 and then applied to the stepping motor 3, so that the latter is rotated in the direction in which the shutter blades 4 and 5 are closed. Therefore, the opening or exposure time of the shutter blades 4 and 5 is equal to a time interval from the time when the transistor 41 which has been short-circuiting the capacitor 42 is cut off, to the time when the transistor 44 is also cut off, as shown at S in FIG. 6. The aperture is set to $f$-8 in response to two opening pulse signal, and the effective exposure time is U.

In the instant embodiment, the stepping motor 3 has been described as being reversed in response to the negative going pulses, but it is to be understood that it is not necessary to use the negative going pulses R to reverse the stepping motor when the combination of a stepping motor of the type rotating stepwise by switching the polarity of excitation in each phase of the two-phase field coils and its control circuit is used, as will be described in detail hereinafter.

Referring to FIG. 8, a control circuit comprises a plurality of flip-flops, a plurality of gate circuits for controlling the flip-flops and a transistor bridge circuit. The output terminals Q and $\overline{Q}$ of flip-flops 1D and 2D are connected to the motor coils 100 and 101 of the stepping motor through current switching circuits, each consisting of a transistor bridge circuit. The positive pulse signals are applied to a CP terminal, and the level of the signal applied to the terminal W is suitably switched, so that the energization of the coils 100 and 101 is controlled to rotate the stepping motor in either direction. More particularly, when the pulse signals $X_1$, $X_2$, . . . , and $X_n$ shown in FIG. 9A are applied to the terminal CP while the signal applied to the terminal W is changed from a high level to a lower level at $T_1$ as shown in FIG. 9B, the rotation of the stepping motor 3 is reversed. Thus, the shutter blades 4 and 5 are opened to define the aperture with a desired $f$-number and then closed as shown at the bottom of FIG. 6.

Thereafter, a reset signal generator 95' generates the reset signal in response to which the circuits are reset. The details of the reset signal generator 95' is shown in FIG. 10. When the shutter blades 4 and 5 are closed, a switch 81 interlocked therewith is closed, so that the high level signal +B is applied through a resistor 83 to one input terminal of an AND gate 82. Therefore, the high level output signal is derived from the AND circuit 82 when the high level signal which is generated when the switch 81 (See FIGS. 11A and 11B) is closed and the last pulse signal, which is the pulse signal which appears after the pulse signal Z indicated by R in FIG. 6 has appeared and which is converted by a transistor 84 into the positive going pulse signal, are simultaneously applied to the AND gate 82. The potential at point P rises, so that the power from the power supply +B is applied through a resistor 86 to the gate of a thyristor 85. The thyristor 85 conducts so that the charge on a capacitor 87 is discharged through a resistor 88. As a result, the voltage across a resistor 89 rises, so that a transistor 90 is cut-off. Consequently, the high level signal is transmitted from an output terminal 69' to the ring counter 20, the flip-flop 37, the ring counter 39, the flip-flops 52, 53 and 54 and other circuits so that they are reset. Thus, the shutter blades are positively held in closed position. The resetting time depends upon a time constant which in turn depends upon the values of the resistors 88 and 89 and the capacitor 87. Another reset signal $\overline{69'}$ which is an inverted signal of the reset signal at the output terminal 69' is also transmitted to a transistor 91 (See FIG. 3) to cause it to conduct, so that a capacitor 103 which has been charged with the polarity shown, is discharged through a resistor 92. As a result, the thyristor 64 is cut off, so that the transistor 67 is also cut off. Thus, the supply of the power to the various circuits is interrupted; that is, the whole operation is completed.

Next referring to FIGS. 11A and 11B, the switch 81 interlocked with the shutter blades 4 and 5 will be described in more detail. When the shutter blades 4 and 5 are opened as shown in FIG. 11A, the contacts 104 and 105 of the switch 81 are separated from each other; but when the shutter blades 4 and 5 are closed, the upper shutter blade 5 causes the contact 105 to move upward to make into contact with the contact 104, so that the high level signal is applied to one of the input terminals of the AND gate 82 (See FIG. 10).

As described hereinbefore, the program-controlled shutter in accordance with the present invention includes no mechanical parts other than the shutter blades and the stepping motor, so that the undesirable features described elsewhere may be substantially overcome. The aperture or $f$-number is determined immediately before the shutter blades are opened, so that even when the brightness of a subject changes at a relatively high speed, the correct aperture may be immediately selected and set.

As described above, the program-controlled shutter in accordance with the present invention, is actuated when the switch 66 (See FIG. 3) is closed. A relatively small force is required to close the switch 66, so that the shaking of the camera due to the depression of the shutter button can be prevented completely. The program-controlled shutter may also be actuated by applying the external electrical signal from an external signal source 200 to the terminal 66' (See FIG. 3). When the terminal 66' is connected to a wireless receiver, it becomes possible to remotely control the program-controlled shutter from a remotely located wireless transmitter. Since the program-controlled shutter is almost electronically controlled, the shutter operation may be repeatedly cycled at a desired time interval in response to the pulse signals applied to the terminal 66' so that various multi-exposures may become possible. These multi-exposures may be also remotely controlled in the manner described above. Thus, the camera incorporating the program-controlled shutter, in accordance with the present invention may be used in a manner hitherto unattainable by the conventional cameras.

What is claimed is:
1. A program-controlled shutter comprising
   a. an exposure control mechanism comprising a plurality of shutter blades which also function as the aperture control blades, and driving means which is rotated intermittently in one direction through a discrete angle in response to opening pulse signals for opening said shutter blades and is rotated intermittently in a direction opposite to said one direction through a discrete angle in response to closing pulse signals to close said shutter blades, said driving means having sliding elements slidably contacting said shutter blades for opening and closing said shutter blades in accordance with the rotation of said driving means;
   b. opening pulse signal generator means for applying the opening pulse signals the number of which is dependent upon the brightness of a subject to said driving means so that the latter causes said shutter blades to open to define a desired aperture depending upon the brightness of said subject;
   c. closing pulse signal generator means for applying the closing pulse signals to said driving means after said shutter blades have been opened for a desired time interval depending upon the brightness of the subject, thereby closing said shutter blades, said closing pulse generator operating independently of the termination of pulses from said opening pulse generator;

d. control means for controlling the operations of said exposure control mechanism, said opening pulse signal generator means, and said closing pulse signal generator means; and e. power supply means for supplying the electric power to said exposure control mechanism, said opening pulse signal generator means, said closing pulse signal generator means and said control means.

2. A program-controlled shutter as set forth in claim 1 wherein each of said shutter blades are provided with a guide groove into which is fitted said driving element of said driving means and with an aperture defining portion which, when said shutter blades are opened, defines an aperture in cooperation with the aperture defining portions of said shutter blades, and said driving elements are driving pins.

3. A program-controlled shutter as set forth in claim 1 wherein said plurality of shutter blades are overlapped partly, and are moved away from each other so as to define an aperture.

4. A program-controlled shutter as set forth in claim 1 wherein said opening pulse signal generator means comprises
a. an opening pulse signal generating circuit for generating a train of opening pulses with a predetermined pulse interval,
b. first brightness detecting means for detecting the brightness of the subject, and
c. means for determining the number of said opening pulses to be applied to said driving means in response to the output from said first brightness detecting means.

5. A program-controlled shutter as set forth in claim 4 wherein said means for determining the number of said opening pulses to be applied to said driving means comprises
a. a circuit for generating an output signal representative of the number of opening pulses generated by said opening pulse generating circuit, and
b. a comparator for comparing said output signal with the output from said first brightness detecting means for detecting the brightness of said subject.

6. A program-controlled shutter as set forth in claim 5 wherein said circuit for generating the output signal representative of the number of opening pulses includes means for controlling the magnitude of said output signal.

7. A program-controlled shutter as set forth in claim 4 wherein said closing pulse signal generator means comprises
a. a closing pulse signal generating circuit for generating the closing pulses with a predetermined pulse interval,
b. second brightness detecting means for detecting the brightness of said subject, and
c. a circuit for setting a first operating level in response to said opening pulse signals, and
d. a switching circuit for permitting the transmission of said closing pulse signals to said driving means when the level of the output from said second brightness detecting means reaches said first operating level.

8. A program-controlled shutter as set forth in claim 7 wherein said circuit for setting said first operating level includes voltage driving means for adjusting said first operating level.

9. A program-controlled shutter as set forth in claim 1 wherein said opening pulse signal generator means includes means for interrupting the application of the opening pulse signal to said driving means after a predetermined number of said opening pulse signals have been applied to said driving means.

10. A program-controlled shutter as set forth in claim 1 wherein said control means comprises
a. a first control circuit for actuating said exposure control mechanism, said opening pulse signal generator means and said closing pulse signal generator means and maintaining them in an actuated state, and
b. a second control circuit for deactivating said first control circuit in response to the brightness of said subject.

11. A program-controlled shutter as set forth in claim 10 wherein said first control circuit comprises
a. first switching means,
b. second switching means which is closed and remains closed when said first switching means is closed,
c. means actuable in response to the closing of said second switching means for setting said exposure control mechanism, said opening pulse signal generator means and said closing pulse signal generator means, and
d. power supply connection means connected to said setting means and actuable at a predetermined time after said setting means is actuated for connecting said exposure control mechanism, said opening pulse signal generator means and said closing pulse generating means to said power supply means.

12. A program-controlled shutter as set forth in claim 10 wherein said second control circuit comprises
a. a control signal generating circuit actuable when said shutter blades are closed for generating a control signal, and
b. means for interrupting the connection between said power supply means and said exposure control mechanism, said opening pulse signal generator means and said closing pulse signal generator means in response to the control signal from said control signal generating circuit.

13. A program-controlled shutter as set forth in claim 11 wherein said first switching means is closed in response to the shutter release operation.

14. A program-controlled shutter as set forth in claim 11 wherein said first switching means is closed in response to external signal from an external signal generating means remote from said program-controlled shutter.

15. A program-controlled shutter as set forth in claim 12 wherein said power supply connection interruption means includes switching means actuable in response to the control signal from said control signal generating circuit for deactivating said first control circuit.

* * * * *